United States Patent [19]

Rubin

[11] Patent Number: 5,558,349
[45] Date of Patent: Sep. 24, 1996

[54] SELF-LOCKING BICYCLE

[76] Inventor: David M. Rubin, 1102 Emerson St., Palo Alto, Calif. 94301

[21] Appl. No.: 368,925

[22] Filed: Jan. 5, 1995

[51] Int. Cl.[6] .............................. B62K 19/00; B62H 5/00
[52] U.S. Cl. ............................................ 280/287; 70/233
[58] Field of Search .................................. 280/274, 278, 280/281.1, 287, 288.4; 70/233, 234

[56] References Cited

U.S. PATENT DOCUMENTS

| | | | |
|---|---|---|---|
| 3,774,421 | 11/1973 | Stephens, Jr. ............................ | 70/234 |
| 3,814,462 | 6/1974 | Kelly ........................................ | 280/287 |
| 4,252,335 | 2/1981 | Brenner ................................ | 280/278 X |
| 4,417,745 | 11/1983 | Shomo .................................... | 280/287 |
| 5,149,112 | 9/1992 | Nauman et al. ........................ | 280/7.11 |

FOREIGN PATENT DOCUMENTS

| | | | |
|---|---|---|---|
| 883836 | 4/1943 | France . | |
| 360530 | 7/1938 | Italy . | |
| 35 | 9/1913 | Netherlands ............................ | 280/287 |

OTHER PUBLICATIONS

Advertisement flyer entitled "The Bicycle Torque Coupling System" S and S Machine, 9334 Viking Place, Roseville, CA 95747 (two sides), Aug. 1993.

*Primary Examiner*—Kevin Hurley
*Attorney, Agent, or Firm*—Skjerven, Morrill, MacPherson, Franklin & Friel; Thomas S. MacDonald

[57] ABSTRACT

A polygonal frame self-locking bicycle includes a head tube mounting a wheel-containing front fork, a down tube rigidly connected between the head tube and a pedal crank housing, a seat tube mounting a rear fork and wheel and rigidly connected to the crank housing and a top tube locking with and demountable from at least one of the head and seat tubes. Preferably, a top tube end is key-locked to the seat tube and the other end affixed to a clamping cylinder around the head tube. Loosening of the clamping cylinder permits pivoting an unlocked top tube to open a space between the seat and head tubes. The demounted top tube forms a frame opening that can be leaned past a vertical pole and the top tube remounted and relocked locking the frame about the pole.

11 Claims, 4 Drawing Sheets

SELF-LOCKING BICYCLE

FIELD OF THE INVENTION

The present invention is directed to a bicycle locking system. More particularly, the invention relates to a bicycle frame which is generally and easily lockable to a vertical structural or material element such as a metal or wooden post or tree trunk.

BACKGROUND OF THE INVENTION

Approximately one-half million bicycles are stolen each year, and many are stolen because they are inadequately locked. Bicycling magazine (August, 1994) reports test results in which most portable bicycle locks were violated in less than one minute. To combat theft, two general systems of portable bicycle locks have been developed in prior art. Each kind of lock has a different weakness, which may allow the bicycle to be stolen with relative ease.

A first kind of lock includes one or more elements such as a lock, shackle, or cable) that is external to or carried by the bicycle frame. This kind of lock attempts to secure the bicycle to a stationary external object. Because these locks have at least one component that is external to the bicycle frame, the locks can be broken using simple hand tools, such as bolt cutters to cut a cable, an automobile jack to pry a lock open,or a hammer to shatter a lock that a thief made brittle by subjecting it to extreme cooling with dry ice or liquid nitrogen. With this class of devices, the external components of the lock can be broken or compromised without damaging the bicycle or disturbing its operation. The stolen bike is usable and sellable.

A second kind of bicycle lock eliminates the weakness of an external element by keeping the locking system essentially entirely within the bicycle frame. This kind of lock makes the bicycle non-functional, but the bicycle can nevertheless be stolen merely by picking it up and carrying it to another location where the internal lock can be broken or removed using more sophisticated tools. An example of this is U.S. Pat. No. 3,774,421 (Stephens) where the horizontal top tube of a bicycle frame includes a lock and a chain is stored within the top tube. In use, however, the chain in the locking mode can be easily cut by a thief.

To effectively prevent theft, a locking system must have two characteristics: (a) every piece of the locking system must be protected within the bicycle, so that breaking the lock causes damage to the bicycle, and (b) the lock must secure the bicycle to a fixed external object. In order to meet these geometric requirements, the bicycle frame itself should function as a lock.

The art of folding bicycles broadly suggests the use of articulating bicycle frame parts so as to make the bicycle smaller and more easily transported or stored. U.S. Pat. No. 4,417,745 (Shomo) discloses a bicycle which hinges inter alia about a vertical hinge located in the bicycle frame. This bicycle along with most or all other folding bicycles, serves no anti-theft purpose. Folding bicycles with their myriad of folding parts requires manufacturing considerably different from a standard bicycle. Components to separate a bicycle for packing in a wheel-sized carrying case have been sold by S and S Machine, Roseville, Calif. Torque couplings are provided to separate one end of the bicycle top tube, one end of the down tube and the front fork from the seat tube, the pedal crank housing and the rear fork. Italian Patent No. 360,530 (Ascaralli) shows separation of a head tube from a top tube, seat tube and a bottom tube leading to the pedal crank housing. French Patent No. 883,836 also shows a folding bicycle having a series of pivoting joints in each of the bicycle frame tubes with one end of a top tube being demountable from the seat tube. None of the above collapsible or folding bicycles serve any anti-theft purpose. U.S. Pat. No. 3,814,462 (Kelly) shows an anti-theft bicycle frame where one end of a top tube is split and lockable to a stub end of the top tube attached to the seat tube and where the forwardly extending diagonal frame members i.e. most of the fixed top tube, the head tube and the down tube are pivotably connected to the pedal crank housing. This necessitates the whole bicycle or at least a pivoted half to be lifted to open the bicycle as seen in FIG. 5 of Kelley and the need for a special pivoting joint at the crank housing or otherwise, where the bicycle is lifted off the ground in order to open the frame.

From the above it is seen that there has been a need for a simple but effective locking system contained in the structure of the bicycle 1) where damaging the lock or top tube damages and immobilizes the bicycle, 2) where the bike can be simply and easily leaned against a pole or tree or other immovable structural member, so that the bicycle can be relocked and then cannot be carried away by a thief and 3) where these needs can be accomplish with a standard bicycle frame slightly modified and enabling manufacture using standard processes.

SUMMARY OF THE INVENTION

The above needs may be realized by providing a self-locking bicycle where the top tube only of the normally closed polygonal portion of the frame, i.e. the top tube, the down tube and seat tube, is unlocked and removed, or unlocked and pivoted, so as to open the bicycle at a top tube removed position so that the then open top bicycle merely can be leaned into a tree trunk or immovable vertical high pole and the top tube replaced or repivoted between the down tube and seat tube and then relocked. An unauthorized user of the bicycle would have to destroy the frame in order to remove the bicycle from the immovable fixed external object (tree, pole or other fixed bar post structure).

The invention provides a self-locking bicycle including a head tube rotatively mounting a wheel-containing front fork; a down tube rigidly connected to and extending from the head tube to a fixed bicycle drive pedal crank housing; a seat tube rigidly extending from a bicycle seat assembly to the crank housing and rigidly connected thereto, the seat tube rigidly mounting a wheel-containing rear fork; and an essentially horizontal top tube extending from the head tube to the seat tube; the top tube being lockingly affixed between the head tube and the seat tube and demountable from at least one of the head tube and the seat tube.

DETAILED DESCRIPTION

Figure 1:
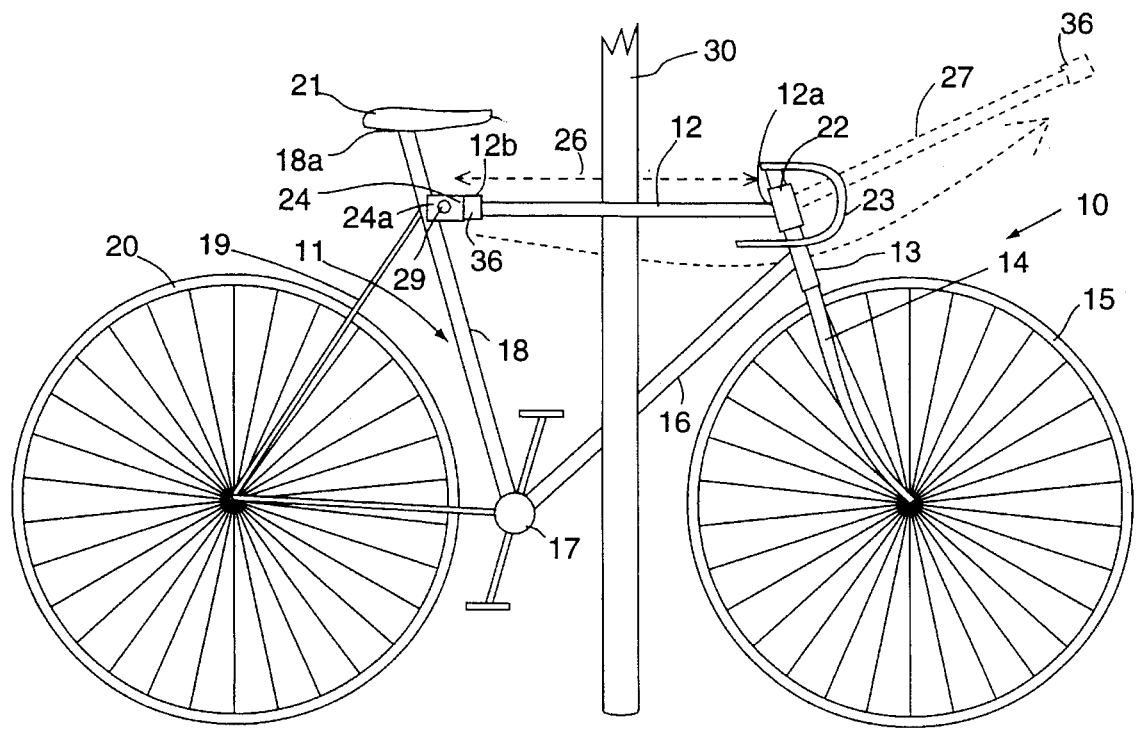
FIG. 1 is a side view of a self-locking bicycle of the invention locked to a vertical pole and the top tube and, in phantom, the top tube in a pivoted opened position prior to leaning the bicycle into a pole.

Referring to FIG. 1 of the drawing, a bicycle 10 of conventional construction having a triangular polygonal frame 11 including an essentially horizontal top tube 12, a head tube 13 supporting a front fork 14 and front wheel 15, a down tube 16 rigidly affixed to and extending from the head tube 13 to a lower end rigidly affixed to a pedal crank housing 17, and a seat tube 18 rigidly affixed to the crank housing and supporting a rear fork 19 and rear wheel 20. A saddle assembly 21 is adjustably mounted on or in the top end 18a of the seat tube 18. The forward end 12a of top tube 12 is hinged (pivotable) on a cylinder 22 which is rotatable on head tube 13 below handle bars 23. The other seat end 12b of top tube 12 is lockingly affixed to a connector 24 having a bolt head part 24a which is rigidly fixed to the seat tube 18 and a locking and torque transmitting connector end 25. Rigid affixation of the above parts is normally done by welding.

Unlocking of the top tube 12 and removal of a nut part 36 of the connector end 25 and the top tube 12 from bolt head 24a, along with loosening of cylinder 22 on the head tube 13, permits the top tube to be pivoted into the dashed lined position 27 opening up frame 11. The bicycle then can be leaned into a high post or tree trunk 30 with the opening 26 between the head tube 13 and seat tube 18 passing past the post or tree. The pivoted top tube 12 is then repivoted and reconnected by the tube captured nut 36 (FIG. 3) to the bolt head 24a, and by retightening cylinder 22 on the head tube 13, to return structural integrity to the bicycle. A locking mechanism FIGS. 3 and 4 in the bolt head 24a is then turned or otherwise actuated to lock the top tube and a tube captured nut 36 to the connector end 25 and the bolt head 24a. The nut 36 is captured on the tube end 12b by a fixed peripheral ring 12c extending cylindrically therearound, preventing removal of the bicycle from the pole 30, except by one having a key accessing a key slot 29 or a combination, if a combination lock is incorporated, or when another mechanical or electronic lock actuator is employed. Any other attempt to remove the bicycle would result in such damage to the bicycle that it would no longer have structural integrity. The pole 30 must be high enough e.g. a flag or light pole or the like, so that one could not lift the bike over the pole top.

Figure 2:
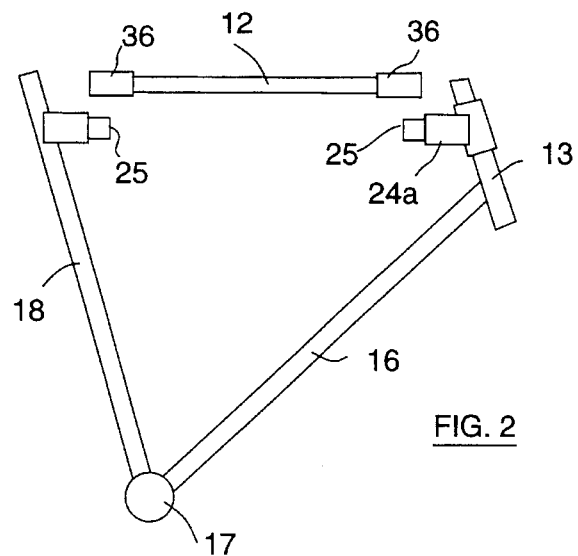
FIG. 2 is a side view of a second embodiment thereof showing the top tube entirely removed.

FIG. 2 shows a second embodiment of the invention in which the top tube includes a captured nut 36 at each tube end, and the top tube and nuts are entirely removed from respective bolt heads 24a and connector ends 25 on the head tube 13 and seat tube 18. The bicycle can then be leaned into a tree or pole as seen in FIG. 1. The nuts are each shifted back toward the middle of top tube 12 and are repositioned and rethreaded on the bolt heads 24a reconstituting the structural integrity of the bicycle and then locked preventing unauthorized access to the bicycle locked around the tree trunk or pole.

Figure 3:
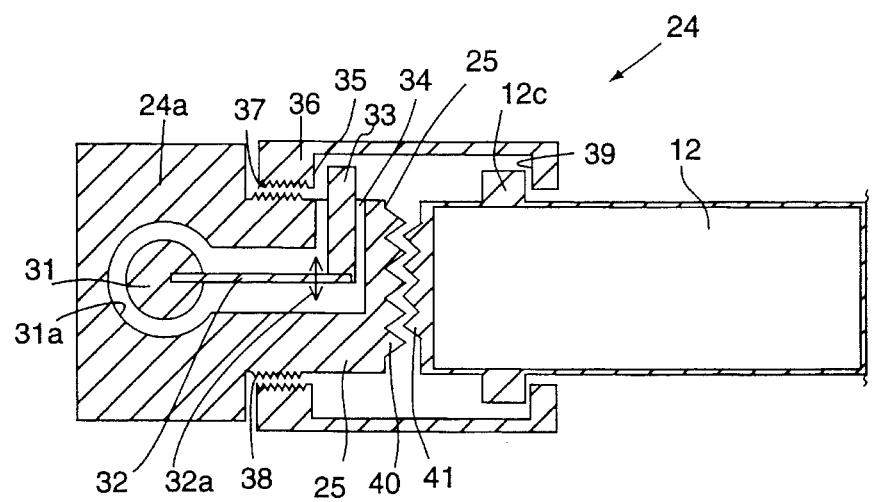
FIG. 3 is a cross-sectional view of a top tube locking torque connector.
Figure 4:
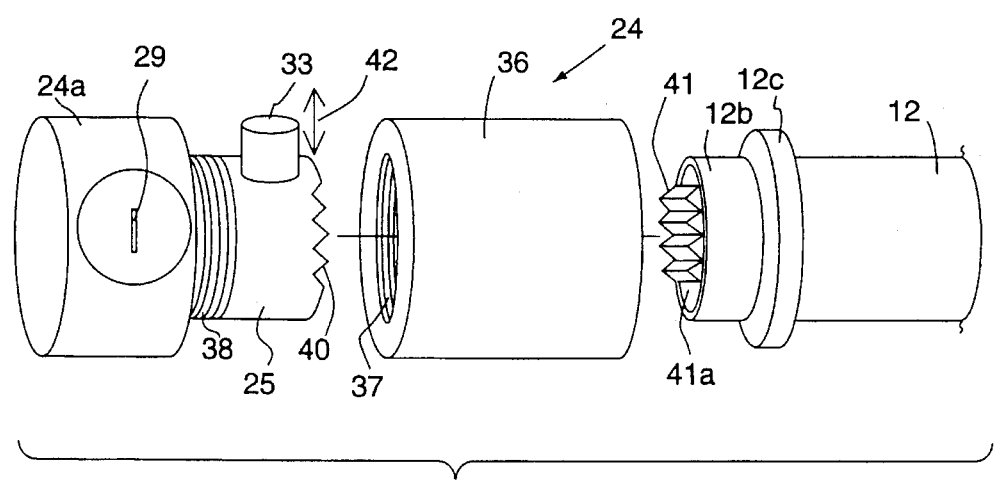
FIG. 4 is a perspective exploded view thereof.

FIGS. 3 and 4 illustrate a first embodiment of the tube connector 24. The connector 24 includes a bolt head 24a rigidly affixed as by welding typically to the seat tube in FIG. 1. In the FIG. 2 embodiment separate bolt heads are rigidly affixed to both the seat tube and head tube. The bolt heads include a key-lock cylinder 31 and cylinder bore 31a. For illustration purposes only, the bore 31a and cylinder are shown as being gapped. Normally, the cylinder will slide into the bore with a close sliding fit. The cylinder includes a fixed cantilevered arm which is rotatable over about 15° to 20° of arc to move (arrows 32a) a cylinder bolt 33 attached to the arm, slidingly through an aperture 34 in an intermediate portion of connector end 25 outboard of a threaded part 38 of the intermediate portion. In a locked position, bolt 33 coacts and abuts against an interior flange surface 35 of nut 36 to lock the top tube. A facing opposite nut end interior flange surface 39 abuts a peripheral side surface of fixed ring 12c on tube 12, when the nut threads 37 fully cinch up the nut on the threads 38 of the intermediate portion. The peripheral end of the connector end 25 includes an anti-rotation surface, for example, a series or plurality of parallel ridges 40 which interfit in friction contact in the fully cinched-up assembled condition of the threaded nut and threaded bolt portion, with a corresponding anti-rotation surface, such as a second series or plurality of parallel ridges 41 on the end of the top tube. The ridges may be provided on an end of a plug 41a which is insertable into the end 12b of tube 12. Arrows 42 illustrate the sliding action of bolt 33 to be in a position less than the diameter of threads 37 at an inner position and to lock against flange surface 35 in an outer position. The gaps between the threaded members, and around the bolt 33 and between ridges 40 and 41 are likewise made large for illustration purposes only. In actuality, in the connected mode of operation, these are all within sliding or abutting surface tolerances. For manufacturing assembly purposes, the ring 12c is welded to tube 12 after nut 36 has been inserted over the tube end 12b and slid rearwardly past the position at which ring 12c is to be welded.

Figure 5:
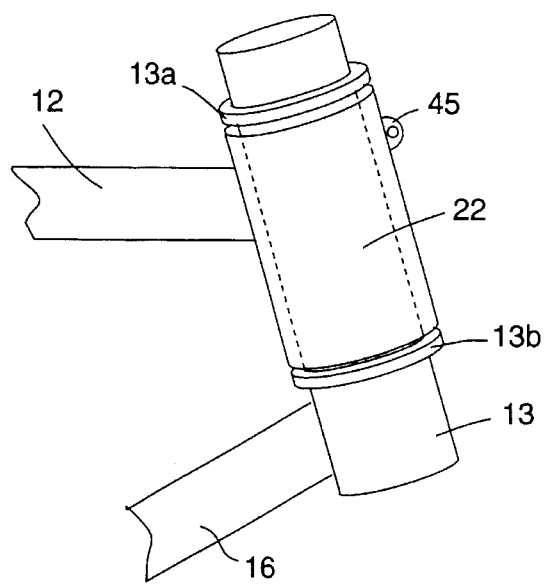
FIG. 5 is a perspective view of a top tube on a pivot cylinder on a bicycle head tube.
Figure 6:
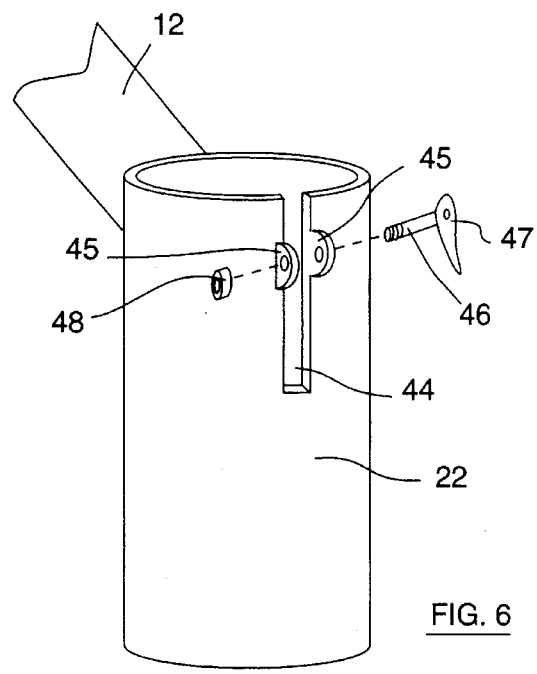
FIG. 6 is a perspective view of an unclamping device for the pivot cylinder permitting pivoting of the top tube.

FIGS. 5 and 6 illustrate the pivot cylinder 22 which is initially loosely mounted around head tube 13 between cylindrical ridges 13a and 13b to confine the cylinder longitudinally. The cylinder 22 is rigidly affixed to top tube 12 and contains an opposed longitudinal slot 44, the edges of which may be tightened together by the clamping of integral spaced tabs 45 extending outwardly from the slot edges, which tabs and edges can be brought together by a hand-operated lever 47 and integral bicycle clamp bolt 46 threaded into nut 48. When the tabs and slot edges are brought together, the cylinder is firmly clamped to head tube 13 affording sufficient structural integrity to the connection between the top tube and head tube. Loosening of bolt 47 allows the top tube to be pivoted, after the other end 12b of the top tube has been unlocked from connector end 25, allowing the bike frame to be positioned about a pole.

Figure 7:
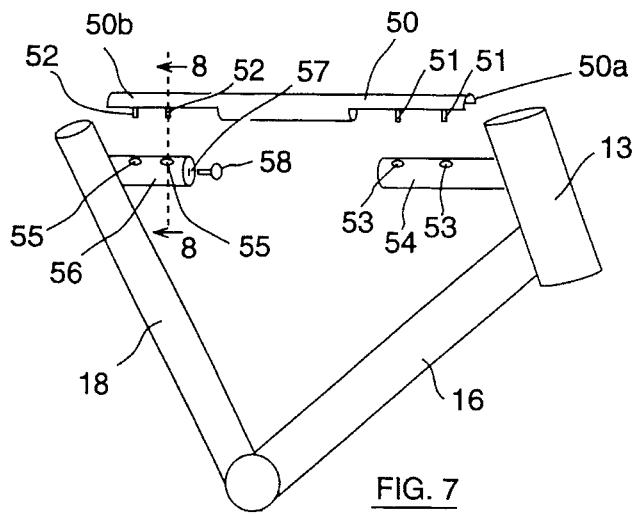
FIG. 7 is an exploded perspective view of a second embodiment of the top tube and locking connector thereof in a disconnected mode.
Figure 8:
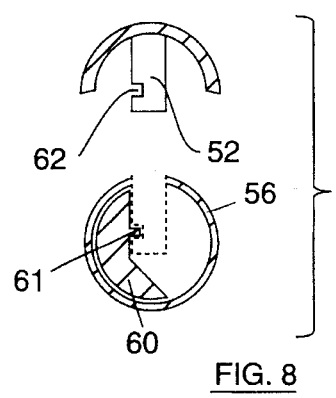
FIG. 8 is an exploded schematic cross-sectional view of the locking mechanism taken on the line 8—8 of FIG. 7.

FIGS. 7 and 8 show a second embodiment of a locking connector in which a top tube 50 is modified to have half-round ends 50a and 50b which include depending locking pins 51 and 52. Top tube stubs 54 and 56 are welded to the head tube and seat tube respectively and each contain apertures 53 and 55. Pins 51 slidingly fit into apertures 53 and pins 52, each of which having a lock notch 62, fit into apertures 55 at the tube end 50a. A key-operated locking cylinder 57 is provided in the end of stub 56, including a rotatable lock operator 60 having a locking tongue 61 which is rotatable into locking engagement with notches 62 of inserted pins 52. The half round end 50b of the top tube 50 is long enough so that key 58 can be inserted into lock cylinder 57. The stubs 54 or 56, the connector ends 25 and bolt heads 24a (FIG. 2) and the cylindrical sleeve 22 (FIG.

5) each variously shown connected to the head tube or seat tube, are included in the generic term "connection piece" used herein, to which ends of the top tube 12 or 50 are connected.

Figure 9:
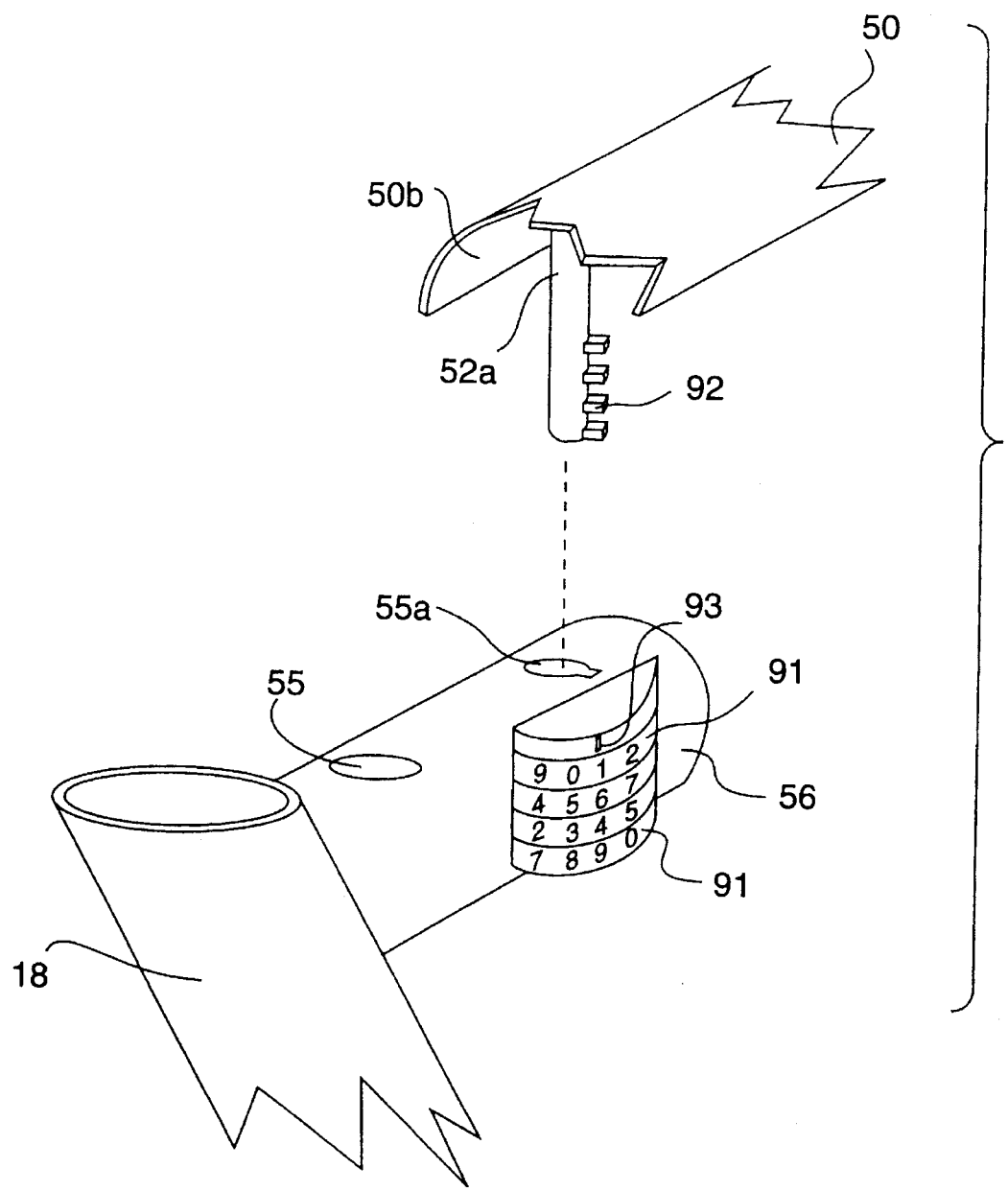
FIG. 9 is an exploded schematic perspective view of the combination lock embodiment of the locking mechanism.

FIG. 9 schematically shows a combination lock embodiment of the locking mechanism. A half-round end 50b of the top tube 50 includes a depending pin 52 (not shown) which is inserted with aperture 55 as in FIG. 7, and a depending cylindrical combination lock pin 52a having aligned spaced projections 92 thereon, as conventionally employed on a bicycle chain combination lock. A series of rotatable dials 91 each with an internal notch (not shown) which notches when aligned, allow the projections 92 on lock pin 52a to pass into top tube stub 56 through aperture 55a and into the notches (not shown) of the dials. When the dials are rotated, in the usual manner as in the bicycle chain combination lock, so that the given lock combination is not aligned with an indicia mark 93, the lock pin 52a is then locked in stub 56. The rotating dials 91 have numbers 0, 1, 2, 3, etc. inscribed on their peripheries to indicate the combination of numbers which must be dialed and aligned with mark 93 to unlock the combination lock.

The above description of embodiments of this invention is intended to be illustrative and not limiting. Other embodiments of this invention will be obvious to those skilled in the art in view of the above disclosure.

I claim:

1. A self-locking bicycle comprising:
   a head tube rotatively mounting a wheel-containing front fork;
   a down tube rigidly connected to and extending from said head tube to a fixed crank housing;
   a seat tube rigidly extending from a bicycle seat assembly to said crank housing and rigidly connected thereto, said seat tube rigidly mounting a wheel-containing rear fork;
   a connection piece connected to said head tube;
   a top tube affixedly mounted between and extending from said connection piece to said seat tube; said top tube including a part of at least one anti-theft lock mechanism for locking said top tube between said head tube and said seat tube, said top tube being demountable from at least one of said head tube and said seat tube;
   wherein said lock mechanism is a key-operated lock or a combination lock; and
   wherein in an unlocked opened demounted condition of the top tube, a resultant opening between said head tube and second seat tube can be leaned past an immobile post structure, and in that position, the top tube is remounted and relocked to lock the bicycle to the post structure; and
   wherein a first end of said top tube is demountable from and lockable by said lock mechanism to one of said head tube and said seat tube and a second end of said top tube is pivotable with respect to the other one of said head tube and said seat tube.

2. A self-locking bicycle comprising:
   a head tube rotatively mounting a wheel-containing front fork;
   a down tube rigidly connected to and extending from said head tube to a fixed crank housing;
   a seat tube rigidly extending from a bicycle seat assembly to said sprocket housing and rigidly connected thereto, said seat tube rigidly mounting a wheel-containing rear fork;
   an essentially horizontal top tube extending from said head tube to said seat tube; said top tube being lockingly affixed between said head tube and said seat tube and demountable from at least one of said head tube and said seat tube;
   wherein in an unlocked opened condition of the top tube, the resultant opening can be leaned past an immobile post structure, and in that position, the top tube is remounted and relocked to lock the bicycle to the post structure; and
   wherein a first end of said top tube is demountably and lockingly fixed to one of said head tube and said seat tube and a second end of said top tube is pivotable with respect to the other one of said head tube and said seat tube; and
   wherein said top tube is pivoted about said head tube.

3. The self-locking bicycle of claim 2 further including a clamping cylinder surrounding and rotatably sliding on said head tube, means for unclamping said cylinder, said top tube being rigidly fixed to said cylinder and being pivotable with said cylinder when said cylinder is unclamped.

4. A self-locking bicycle comprising:
   a head tube rotatively mounting a wheel-containing front fork;
   a down tube rigidly connected to and extending from said head tube to a fixed crank housing;
   a seat tube rigidly extending from a bicycle seat assembly to said sprocket housing and rigidly connected thereto, said seat tube rigidly mounting a wheel-containing rear fork;
   an essentially horizontal top tube extending from said head tube to said seat tube; said top tube being lockingly affixed between said head tube and said seat tube and demountable from at least one of said head tube and said seat tube;
   wherein in an unlocked opened condition of the top tube, the resultant opening can be leaned past an immobile post structure, and in that position, the top tube is remounted and relocked to lock the bicycle to the post structure;
   wherein said top tube is demountably affixed by a connector, said connector comprising a bolt head fixedly connected at one end to one of said head tube and said seat tube, said bolt head including an opposite end including an intermediate threaded portion and an end peripheral portion having a first anti-rotation surface;
   a key-lock cylinder in said bolt head;
   said top tube having an end including a second anti-rotation surface interfittable with said first anti-rotation surface in an assembled condition; and
   a nut captured by said top tube for threadedly cinching said tube against said bolt head with said anti-rotation surfaces in aligned friction contact.

5. The self-locking bicycle of claim 4 wherein said key-lock cylinder includes a fixed rotatable arm and a cylinder bolt attached to said arm, said cylinder bolt extending slidingly through an aperture in said bolt head intermediate portion to coact with and allow removal of said tube-captured nut from said bolt head and demounting of said top tube from at least one of said head tube and said seat tube.

6. The self-locking bicycle of claim 4 wherein said first and second anti-rotation surfaces comprise mating first and second parallel ridges.

7. A self-locking bicycle comprising:
   a head tube rotatively mounting a wheel-containing front fork;
   a down tube rigidly connected to and extending from said head tube to a fixed crank housing;

a seat tube rigidly extending from a bicycle seat assembly to said crank housing and rigidly connected thereto, said seat tube rigidly mounting a wheel-containing rear fork;

a connection piece connected to said head tube;

a top tube affixedly mounted between and extending from said connection piece to said seat tube; said top tube including a part of at least one anti-theft lock mechanism for locking said top tube between said head tube and said seat tube, said top tube being demountable from at least one of said head tube and said seat tube;

wherein in an unlocked opened demounted condition of the top tube, a resultant opening between said head tube and second seat tube can be leaned past an immobile post structure, and in that position, the top tube is remounted and relocked to lock the bicycle to the post structure; and wherein said lock mechanism is a key-operated lock.

8. A self-locking bicycle of comprising:
   a head tube rotatively mounting a wheel-containing front fork;
   a down tube rigidly connected to and extending from said head tube to a fixed crank housing;
   a seat tube rigidly extending from a bicycle seat assembly to said crank housing and rigidly connected thereto, said seat tube rigidly mounting a wheel-containing rear fork;
   a connection piece connected to said head tube;
   a top tube affixedly mounted between and extending from said connection piece to said seat tube; said top tube including a part of at least one anti-theft lock mechanism for locking said top tube between said head tube and said seat tube, said top tube being demountable from at least one of said head tube and said seat tube;
   wherein in an unlocked opened demounted condition of the top tube, a resultant opening between said head tube and second seat tube can be leaned past an immobile post structure, and in that position, the top tube is remounted and relocked to lock the bicycle to the post structure; and
   wherein said lock mechanism is a combination lock.

9. A self-locking bicycle of comprising:
   a head tube rotatively mounting a wheel-containing front fork;
   a down tube rigidly connected to and extending from said head tube to a fixed crank housing;
   a seat tube rigidly extending from a bicycle seat assembly to said crank housing and rigidly connected thereto, said seat tube rigidly mounting a wheel-containing rear fork;
   a top tube affixedly mounted between and extending from said head tube and said seat tube; said top tube including a part of at least one anti-theft lock mechanism for locking said top tube between said head tube and said seat tube, said top tube being demountable from at least one of said head tube and said seat tube;
   wherein said lock mechanism is a key-operated lock or a combination lock;
   wherein in an unlocked opened demounted condition of the top tube, a resultant opening between said head tube and second seat tube can be leaned past an immobile post structure, and in that position, the top tube is remounted and relocked to lock the bicycle to the post structure; and
   including at least one connection piece rigidly extending from at least one of the head tube and the seat tube and wherein said top tube is locked by the lock mechanism to the at least one connection piece.

10. The self-locking bicycle of claim 9 wherein a first end of the top tube is lockingly attached by the lock mechanism to one connection piece and a second end is connected to a second connection piece pivotable with respect to said head tube.

11. A self-locking bicycle comprising:
    a head tube rotatively mounting a wheel-containing front fork;
    a down tube rigidly connected to and extending from said head tube to a fixed crank housing;
    a seat tube rigidly extending from a bicycle seat assembly to said crank housing and rigidly connected thereto, said seat tube rigidly mounting a wheel-containing rear fork;
    a connection piece connected to said head tube;
    a top tube affixedly mounted between and extending from said connection piece to said seat tube; said top tube including a part of at least one anti-theft lock mechanism for locking said top tube between said head tube and said seat tube, said top tube being demountable from at least one of said head tube and said seat tube;
    wherein said lock mechanism is a key-operated lock or a combination lock; and
    wherein in an unlocked opened demounted condition of the top tube, a resultant opening between said head tube and second seat tube can be leaned past an immobile post structure, and in that position, the top tube is remounted and relocked to lock the bicycle to the post structure; and
    wherein at least part of said lock mechanism is internal of said top tube.

* * * * *